United States Patent
Samprathi et al.

(10) Patent No.: US 7,391,768 B1
(45) Date of Patent: Jun. 24, 2008

(54) IPV4-IPV6 FTP APPLICATION LEVEL GATEWAY

(75) Inventors: Ravikanth V. Samprathi, Santa Clara, CA (US); Bruce D. Moon, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 945 days.

(21) Appl. No.: 10/437,490

(22) Filed: May 13, 2003

(51) Int. Cl.
H04L 12/56 (2006.01)

(52) U.S. Cl. .................. 370/389; 370/401; 709/219

(58) Field of Classification Search .................. 370/351, 370/389, 401, 352; 709/220, 219, 223
See application file for complete search history.

(56) References Cited

U.S. PATENT DOCUMENTS

| | | | |
|---|---|---|---|
| 5,937,169 A * | 8/1999 | Connery et al. | 709/250 |
| 7,085,270 B2 * | 8/2006 | Inouchi et al. | 370/392 |
| 2006/0146813 A1 * | 7/2006 | Biswas et al. | 370/389 |

OTHER PUBLICATIONS

G. Tsirtsis and P. Srisuresh, RFC 2766 Network Address Translation—Protocol Translation (NAT-PT), Feb. 2000, pp. 13-16.*
Hitachi Ltd, Hitachi Gigabit Router GR2000 Series Enhanced Version, Release 06-05 (Feb. 2003), pp. 9-26 to 9-39.*
Information Sciences Institute, "Transmission Control Protocol" RFC 793, pp. 15-16 and 24.*
G. Tsirtsis, et al., "Network Address Translation-Protocol Translation (NAT-PT)," The Internet Society, Feb. 2000, RFC 2766. pp. 1 to 20.
R. Gilligan, et al., "Transition Mechanisms for IPv6 Hosts and Routers", The Internet Society, Apr. 1996, RFC 1933. pp. 1-21.
R. Hinden, et al., "IP Version 6 Addressing Architecture", The Internet Society, Jul. 1998, RFC 2373. pp. 1-25.
S. Deering, et al., "Internet Protocol, Version 6 (IPv6) Specification", The Internet Society, Dec. 1998. RFC 2460. pp. 1-37.
T. Narten, et al., "Neighbor Discovery for IP Version 6 (IPv6)", The Internet Society, Dec. 1998. RFC 2461. pp. 1-87.
A. Conta, et al., "Internet Control Message Protocol (ICMPv6) for the Internet Protocol Version 6 (IPv6) Specification", The Internet Society, Dec. 1998. RFC 2463. pp. 1-17.

(Continued)

*Primary Examiner*—Hassan Kizou
*Assistant Examiner*—Jeffrey M Rutkowski
(74) *Attorney, Agent, or Firm*—Weaver Austin Villeneuve & Sampson LLP

(57) ABSTRACT

Disclosed are methods and apparatus for handling FTP (file transfer protocol) control packets. In general terms, mechanisms are provided for facilitating FTP sessions between devices utilizing different protocols, such as IPv4 and IPv6. For example, FTP control packets from an IPv6 client to an IPv4 server are handled to facilitate such communication. Likewise, FTP control packets from an IPv4 client to an IPv6 server are handled to facilitate such communication. Communication is also facilitated when either or both of the client or server is in the form of a dual-stack device. To facilitate FTP session between devices having different protocols, FTP control packets between two different protocol devices are translated from one protocol to another protocol when required, e.g., from an IPv6 to an IPv4 format or visa versa.

31 Claims, 12 Drawing Sheets

OTHER PUBLICATIONS

P. Srisuresh, et al., "IP Network Address Translator (NAT) Terminology and Considerations", The Internet Society, Aug. 1999. RFC 2663. pp. 1-29.

P. Srisuresh, et al., DNS Extensions to Network Address Translator (DNS_ALG), Internet Society, Sep. 1999. RFC 2694. pp. 1-28.

E. Nordmark, et al., "Stateless IP/ICMP Translation Algorithm (SIIT)", The Internet Society, Feb. 2000. RFC 2765. pp. 1-25.

K. Egevang, et al., "The IP Network Address Translator (NAT)", The Internet Society6, May 1994. TFC 1631. pp. 1-10.

* cited by examiner

| | | |
|---|---|---|
| 802a | 1 | 192.168.103.1 |
| 802b | 1 | 192.168.103.1 |
| | ⋮ | ⋮ |
| 802c | 0 | 192.168.103.255 |

| | 854 | 856 | 858 |
|---|---|---|---|
| 852a | 192.168.103.1 | 3ffe::1 | t1 |
| 852b | 192.168.103.2 | 2002::1 | t2 |

Figure 8B

| | 874 | 876 | |
|---|---|---|---|
| 872 | Next | Source Address | Dest. Address |
| 878 | Source Port | Dest. Port | 880 |
| | Offset_4to6 | Offset_6to4 | |

IPV4-IPV6 FTP APPLICATION LEVEL GATEWAY

BACKGROUND OF THE INVENTION

The present invention relates to methods and apparatus for processing data within a computer network. More specifically, it relates to mechanisms for handling FTP (file transfer protocol) control packets within a data network having IPv4 only devices, IPv6 only devices, and dual-stack devices.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP addresses is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may duplicate IP address that are used outside of the local network. When a local computer attempts to communicate with a computer outside the local network, the intermediary device matches the local computer's local IP address (and port) to one of the intermediary device's assigned IP addresses (and ports). The intermediary device then replaces the local computer's local address (and port) with the matched assigned IP address (and port). This matched assigned IP address (and port) is then used to communicate between the local computer and the outside computer. Thus, NAT techniques allow IP address to be duplicated across local networks.

Another solution to the lack of available IP addresses is to redesign the address format to allow for more possible IP addresses. The recent introduction of IPv6 provides 128 bits for the IP address, as compared with IPv4 which provides 32 bits for the IP address. However, until all network devices and computers are converted to IPv6, it is still necessary to allow an existing IPv4 device to communicate with an IPv6 device. One popular method that allows IPv4 to IPv6 communication is referred to as protocol translation (NAT-PT). The IP addresses are converted by NAT-PT from one protocol to another protocol (e.g., IPv4 to IPv6 or vice versa). In addition to the IP addresses, the NAT-PT also converts any relevant IPv4 or IPv6 information during a protocol translation. Several embodiments of NAT-PT are described in Internet Engineering Task Force's Request for Comments document RFC 2766, entitled "Network Address Translation—Protocol Translation (NAT-PT)" by G. Tsirtsis and P. Srisuresh (February 2000), which document is incorporated herein by reference in its entirety.

A packet may also contain address(es) embedded in the payload that require translation. Particular applications may embed address(es) in the payload for various application specific purposes, such as DNS (domain name system), FTP (file transfer protocol), or H.225/H.245. Consider a topology where IPv4-only devices, IPv6-only devices and dual-stack devices coexist in a network. The same topology may also contain disparate networks that are IPv4-only (with only IPv4 devices) and networks that are IPv6-only (with only IPv6 devices). With the rising need for moving to IPv6 networks, this kind of topology is a very possible real world situation. In such a topology, and considering the fact that FTP is one of the most commonly used protocols by any IPv4 or IPv6 device, there is an immediate need for any FTP client to be able to use any FTP server. For example, an IPv4 client should be able to download/upload files from an IPv6 server located within the client's network or outside the client's network. Similarly, an IPv6 device should be able to download/upload files from an IPv4 device.

Currently, there are no mechanisms that allow an FTP session between an IPv4 and IPv6 server, and visa versa. In these situations, the FTP control packets have IP addresses (IPv4 or IPv6) embedded in the payload. Also, the commands understood by IPv4 FTP client and IPv4 FTP server are different from the commands understood by IPv6 FTP client and IPv6 FTP server. An IPv4 formatted address and IPv4 formatted control command will not be understood by an IPv6 device. Likewise, an IPv6 formatted address and IPv6 formatted control command will not be understood by an IPv4 device. Therefore, FTP downloads and FTP uploads do not work from IPv4 to IPv6 and vice versa because of the disparate command and address formats.

In view of the above, there is a need for improved mechanisms for facilitating FTP sessions between a client and server which utilize different protocols, such as IPv4 and IPv6.

SUMMARY OF THE INVENTION

Accordingly, the present invention provides methods and apparatus for handling FTP (file transfer protocol) control packets. In general terms, mechanisms are provided for facilitating FTP sessions between devices utilizing different protocols, such as IPv4 and IPv6. For example, FTP control packets from an IPv6 client to an IPv4 server are handled to facilitate such communication. Likewise, FTP control packets from an IPv4 client to an IPv6 server are handled to facilitate such communication. Communication is also facilitated when either or both of the client or server is in the form of a dual-stack device. To facilitate FTP session between devices having different protocols, FTP control packets between two different protocol devices are translated from one protocol to another protocol when required, e.g., from an IPv6 to an IPv4 format or visa versa.

In one embodiment, a method for handling FTP control packets is disclosed. An FTP control packet is received. When the FTP control packet is being sent from an FTP client using an IPv4 protocol to an FTP server using an IPv6 protocol, any addresses and FTP commands (or replies) which have an IPv4 format are translated into an IPv6 format to form a translated FTP control packet and the translated FTP control packet is forwarded to the IPv6 server. When the FTP control packet is being sent from an FTP client using an IPv6 protocol to an FTP server using an IPv4 protocol, any addresses and FTP commands (or replies) which have an IPv6 format are translated into an IPv4 format to form a translated FTP control packet and the translated FTP control packet is forwarded to the IPv4 server. When the FTP control packet is being sent from an FTP server using an IPv4 protocol to an FTP client using an IPv6 protocol, any addresses and FTP commands (or replies) which have an IPv4 format are translated into an IPv6 format to form a translated FTP control packet and the translated FTP control packet is forwarded to the IPv6 client.

When the FTP control packet is being sent from an FTP server using an IPv6 protocol to an FTP client using an IPv4 protocol, any addresses and FTP commands (or replies) which have an IPv6 format are translated into an IPv4 format to form a translated FTP control packet and the translated FTP control packet is forwarded to the IPv4 client. When the FTP control packet is being sent between FTP devices having the same protocol, the FTP control packet is forwarded to its intended destination without translation.

In a specific implementation, the translation operations are capable of translating an active type FTP command (or reply) and a passive FTP command (or reply). In another implementation, the translation operations are capable of one or more of the following: (i) translating an IPv4 PORT command into an IPv6 EPRT command, (ii) translating an IPv4 PASV command into an IPv6 EPSV command, (iii) translating an IPv4 227 reply into an IPv6 229 reply, (iv) translating an IPv6 EPRT command into an IPv4 PORT command, (v) translating an IPv6 EPSV command into an IPv4 PASV command, and (vi) translating an IPv6 229 reply into an IPv4 227 reply.

In yet a further embodiment, a first variable and a second variable value is initialized to zero for each FTP session. The following operations are also performed for each FTP session. When the received FTP control packet is associated with an IPv4 initiated FTP session and is an inbound packet, the following operations are performed (i) subtracting the first variable which corresponds to the received FTP control packet from the received FTP control packet's SEQ value, (ii) subtracting the second variable which corresponds to received FTP control packet from the received FTP control packet's ACK value, and (iii) updating the first variable to correspond to a change in the FTP control packet's payload size after translation (if any). When the received FTP control packet is associated with an IPv4 initiated FTP session and is an outbound packet, the following operations are performed (i) adding the second variable which corresponds to the received FTP control packet from the received FTP control packet's SEQ value, (ii) subtracting the first variable which corresponds to received FTP control packet from the received FTP control packet's ACK value, and (iii) updating the second variable to correspond to a change in the FTP control packet's payload size after translation (if any). When the received FTP control packet is associated with an IPv6 initiated FTP session and is an inbound packet, the following steps are accomplished: (i) adding the second variable which corresponds to the received FTP control packet from the received FTP control packet's SEQ value, (ii) subtracting the first variable which corresponds to received FTP control packet from the received FTP control packet's ACK value, and (iii) updating the second variable to correspond to a change in the FTP control packet's payload size after translation (if any). When the received FTP control packet is associated with an IPv6 initiated FTP session and is an outbound packet, the following events occur: (i) adding the first variable which corresponds to the received FTP control packet from the received FTP control packet's SEQ value, (ii) subtracting the second variable which corresponds to received FTP control packet from the received FTP control packet's ACK value, and (iii) updating the first variable to correspond to a change in the FTP control packet's payload size after translation (if any).

In a specific embodiment, updating the first variable is accomplished by adjusting the first variable by a difference between the first variable and a change in payload size before and after translation of the received FTP control packet. Updating the second variable is accomplished by adjusting the second variable based on a difference between the first variable and a change in payload size before and after translation of the received FTP control packet.

In another embodiment, the invention pertains to a computer system operable to handle FTP control packets. The computer system includes one or more processors and one or more memory. At least one of the memory and processors are adapted to provide at least some of the above described method operations. In yet a further embodiment, the invention pertains to a computer program product for handling FTP control packets. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 8A is a diagrammatic representation of an addresses pool table in accordance with one embodiment of the present invention.

FIG. 8B is a diagrammatic representation of a MAP table in accordance with one embodiment of the present invention.

FIG. 8C is a diagrammatic representation of an example offset entry for a particular FTP session in accordance with one embodiment of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides an Application Level Gateway (FTPALG) for handling FTP control packets so as to facilitate communication between an FTP client and an FTP server which utilize different protocols. FTPALG is generally operable to snoop the packet content of FTP control packets and provide translation of FTP commands (or replies) and addresses contained within both the packet header and payload to enable IPv4 FTP clients to use IPv6 FTP servers and to enable IPv6 FTP clients to use IPv4 FTP servers.

Figure 1:
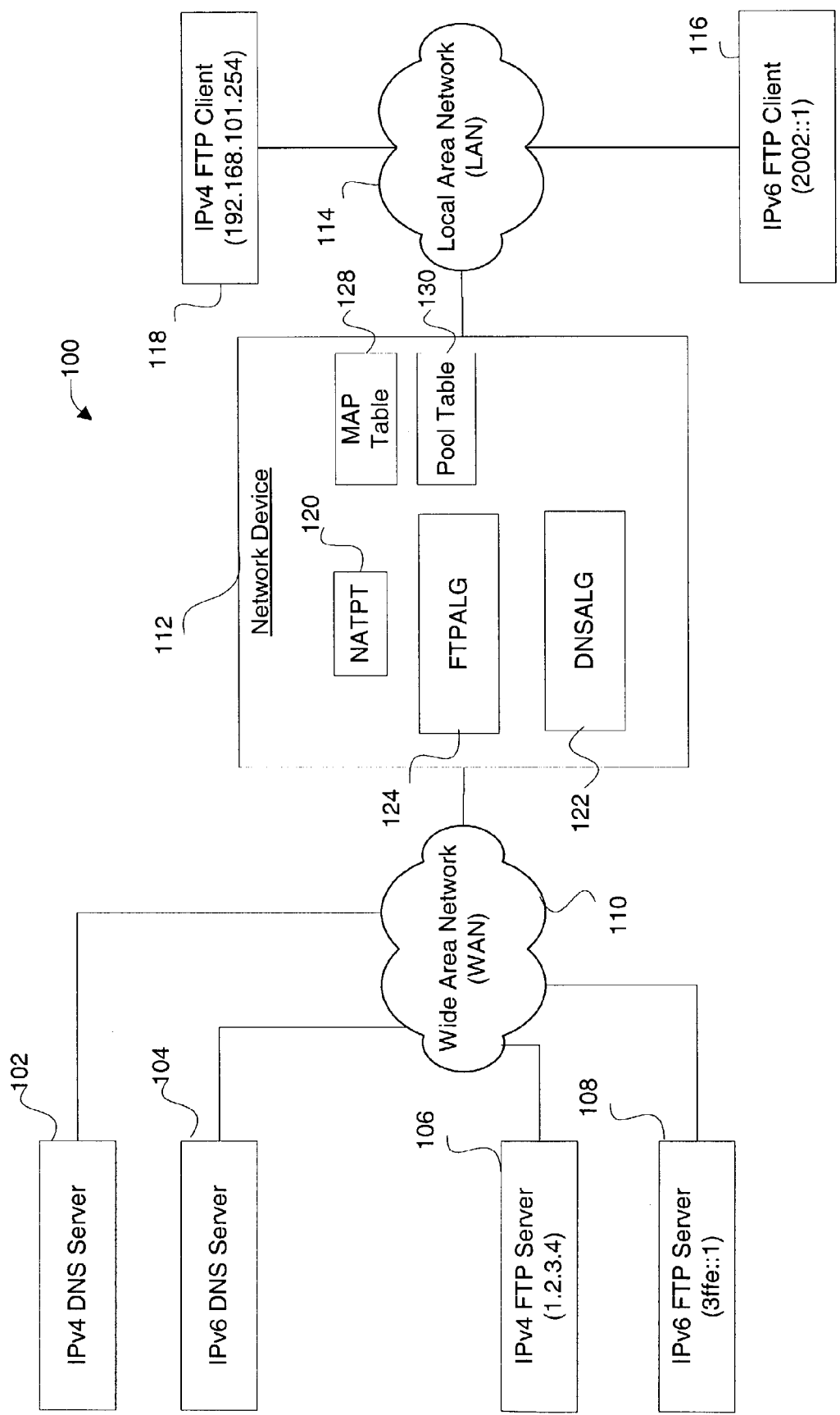
FIG. 1 is a diagrammatic representation of a network in which techniques of the present invention may be implemented in accordance with one embodiment of the present invention.

FIG. 1 is a diagrammatic representation of a network 100 in which techniques of the present invention may be implemented in accordance with one embodiment of the present invention. The devices of this network 100 will be utilized herein to illustrate techniques of the present invention. As shown, the network 100 includes a LAN network 114 and a WAN network 110 coupled through a network device 112. The network device 112 includes several blocks which may be implemented separately in different devices or integrated within a same device. The network device 112 generally includes a NAT-PT (network address translation and protocol translation) device 120, an FTPALG (file transfer protocol application level gateway) 124, and a DNSALG (domain name service application level gateway) 122.

The NAT-PT is operable to translate between different network addresses, ports, and protocols as represented within the data packets traveling through the network device 112. For example, the NAT-PT translates IP addresses from IPv4 to IPv6 of packets sent by an IPv4 device to an IPv6 device, and visa versa. The FTPALG 124 handles FTP control packets which have embedded IP addresses and protocol specific control commands (or replies). For instance, an IPv4 formatted FTP control command is translated into an IPv6 formatted FTP control command when destined for an IPv6 device, and visa versa. The DNSALG 122 is generally operable to handle DNS query and response packets traveling through or to the network device 112. In one implementation, when an IPv4 device makes a DNS query for an IPv6 device, the IPv4 device receives a DNS response containing a translated IPv4 address which corresponds to the IPv6 address of the IPv6 device, and visa versa. Several embodiments of a suitable DNSALG are described further in U.S. patent application having application Ser. No. 10/411,698, filed 11 Apr. 2003 by Samprathi et al., which application is incorporated herein in its entirety.

In the illustrated embodiment of FIG. 1, the WAN network 110 includes an IPv4 only device 106, an IPv6 only device 108. an IPv4 DNS server 102, and an IPv6 DNS server 104. As shown, LAN 114 includes an IPv4 only device 118 and an IPv6 only device 116. Of course, the WAN 110 or LAN 114 may include any number and type of network elements, routers, NAT or NAT-PT devices, DNSALG devices, FTPALG devices, clients, servers, and devices. Additionally, a single IPv4/IPv6 DNS server may be utilized to handle both IPv4 and IPv6 requests. Each DNS server may also be located anywhere else within the network 100, such as within network device 112, coupled directly with network device 112, or within LAN network 114. There may be any suitable number of DNS servers within WAN 110 and/or LAN network 114. Either or both of the networks (WAN 110 or LAN 114) may also include a dual-stack device which can handle both IPv4 and IPv6 protocols. There may be any suitable number and type of network devices within WAN network 110 and/or LAN network 114.

The NAT-PT 120, DNSALG 122, and FTPALG 124 may utilize any suitable number and type of data structures for facilitating their operations as described herein, and these data structures may be shared among the logic blocks of the Network device 112 (i.e., NAT-PT 120, DNSALG 122, and FTPALG 124) or used exclusively by any number of these logic blocks. In one embodiment, the DNSALG device 122 may include any suitable number and type of data structures for handling DNS packets. Several example data structures suitable for facilitating DNS packet handling are described further in the above reference U.S. patent application filed on 11 Apr. 2003. The NAT-PT 120, DNSALG 122, and FTPALG 124 may share an addresses pool table 128 having available translation addresses for the LAN 114 and a MAP table 130 for tracking bindings between translated private and public address. The illustrated data structures of FIG. 1, as well as additional or alternative structures, are described further below in the context of the FTP control packet handling techniques of the present invention.

Figure 2A:
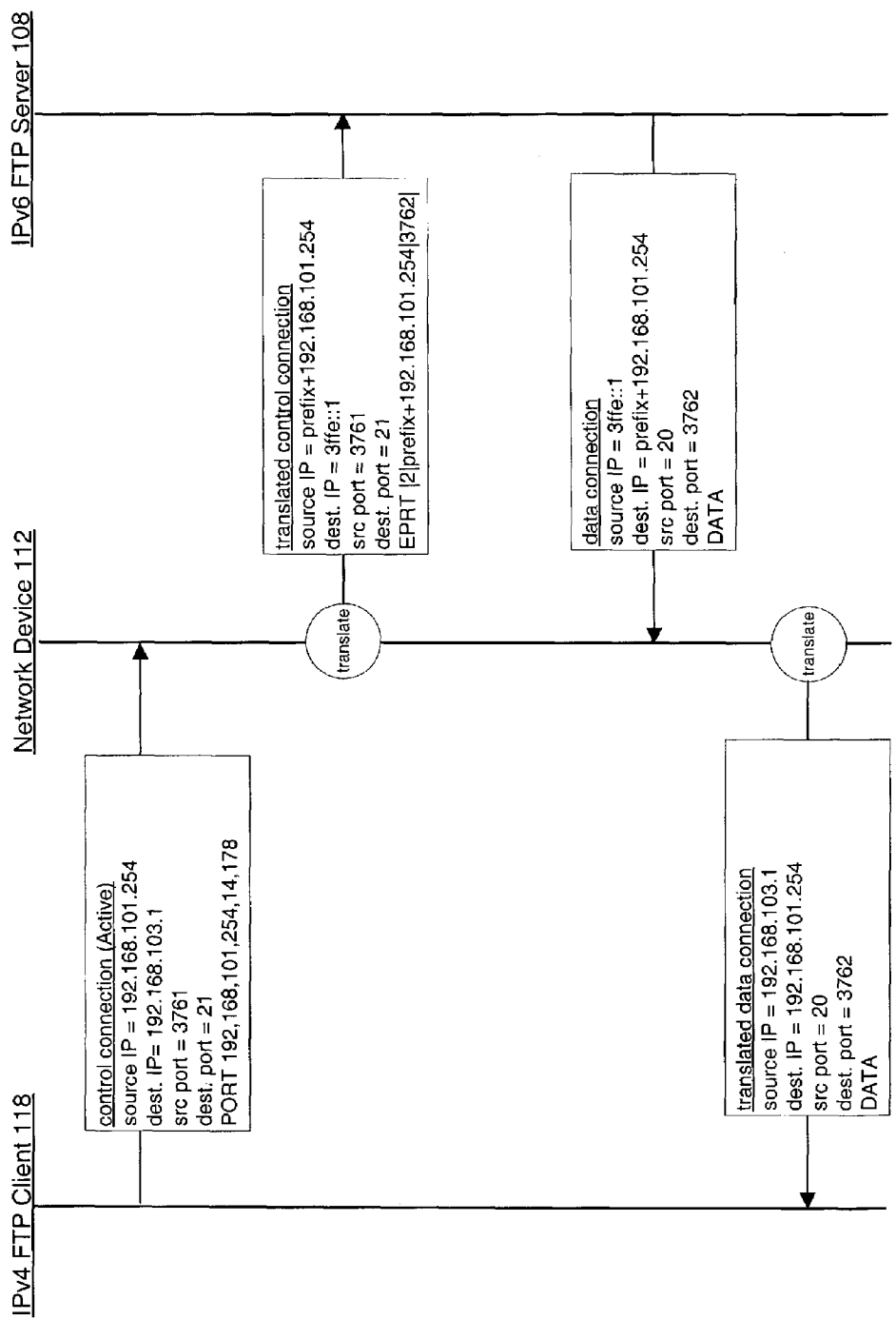
FIG. 2A is a communication diagram illustrating an active type FTP session initiated by an IPv4 FTP client to an IPv6 FTP server in accordance with one embodiment of the present invention.

FIG. 2A is a communication diagram illustrating an active type FTP session initiated by an IPv4 FTP client 118 to an IPv6 FTP server 108 in accordance with one embodiment of the present invention. Initially, the IPv4 FTP client 118 sends a control connection packet to initiate an active type FTP session. The control connection packet includes a source IP address equal to 192.168.101.254 and a destination IP address equal to 192.168.103.1. This control packet also includes a source port equal to 3761 and a destination port equal to 21. The payload of the control connection packet includes a control command in the form of "PORT 192,168, 101,254,14,178." The PORT portion indicates an active type FTP session, and the "192,168,101,254" portion refers to the client's IP address, and the "14,178" portion corresponds to a port at which the client will listen for FTP data. The port may be determined by 14×256+178 (where 256 is a constant and 14, and 178 are obtained from the payload of the control packet sent by the client 118) which results in a port equal to 3762. In the active type of FTP session, the client will wait for FTP data to be sent by the server to a particular port, e.g., 3762.

This control connection packet is received into network device 112 which operates to translate the IPv4 formatted fields of the packet and to an IPv6 format. As shown, the translated control connection packet has a source IP address equal to a prefix+192.168.101.254 and a destination IP address equal to 3ffe::1. The prefix is a 96 bit prefix which is pre-configured within the network device 112 to be used for translating an IPv4 address of the LAN 118 to an IPv6 address which can be used outside the LAN, and visa versa. When the prefix is pre-pended to the client's source IP address, the source address then becomes a 128 bit IPv6 address. The destination address is translated by obtaining an IPv6 address from the MAP table 128 which corresponds to the IPv4 destination address 192.168.103.1. A binding between the IPv4 address 192.168.101.254 and IPv6 address 3ffe::1 was previously formed by the NAT-PT or DNSALG within MAP table 128. This binding may have formed during the initial DNS request when the client 118 initiated an FTP session to server 106. Mechanisms for handling the DNS request and forming bindings are described further in the above reference U.S. patent application filed 11 Apr. 2003.

The source and destination ports remain the same before and after translation of the control packet. The control command is translated into an equivalent IPv6 command. As shown, the control command within the payload is translated into "EPRT |2|prefix+192.168.101.254|3762|." EPRT is the IPv6 version of the IPv4 command PORT. The "2" indicates that the address which follows, if any, is an IPv6 address, and the "prefix+192.168.101.254" is the translated IPv6 address of client 118. The "3762" is the port on which the client will be listening for the FTP data connection. This translated control connection packet is then received by IPv6 FTP server 108.

In an active type FTP session, the IPv6 FTP server 108 initiates the data connection by sending a data connection packet having a source IP address equal to 3ffe::1 and a destination IP address equal to prefix+192.168.101.254. In this example, the source port is equal to 20 and the destination port is equal to 3762. The server uses the destination port 3762 specified by the client within its previously sent control packet. Typically, an FTP server uses a source port of 20 for FTP data connections. Data is also sent in the payload of the data connection packet. This data connection packet is sent through network device 112 which translates it into a translated data connection packet. The translated data connection packet has a source IP address equal to 192.168.103.1 and a destination IP address equal to 192.168.101.254. The source address is translated from the MAP table 128, and the destination address is translated by removing the prefix to form the IPv4 address 192.168.101.254 of the client 118. The source and destination ports remain the same, as well as the data in the payload.

Figure 2B:
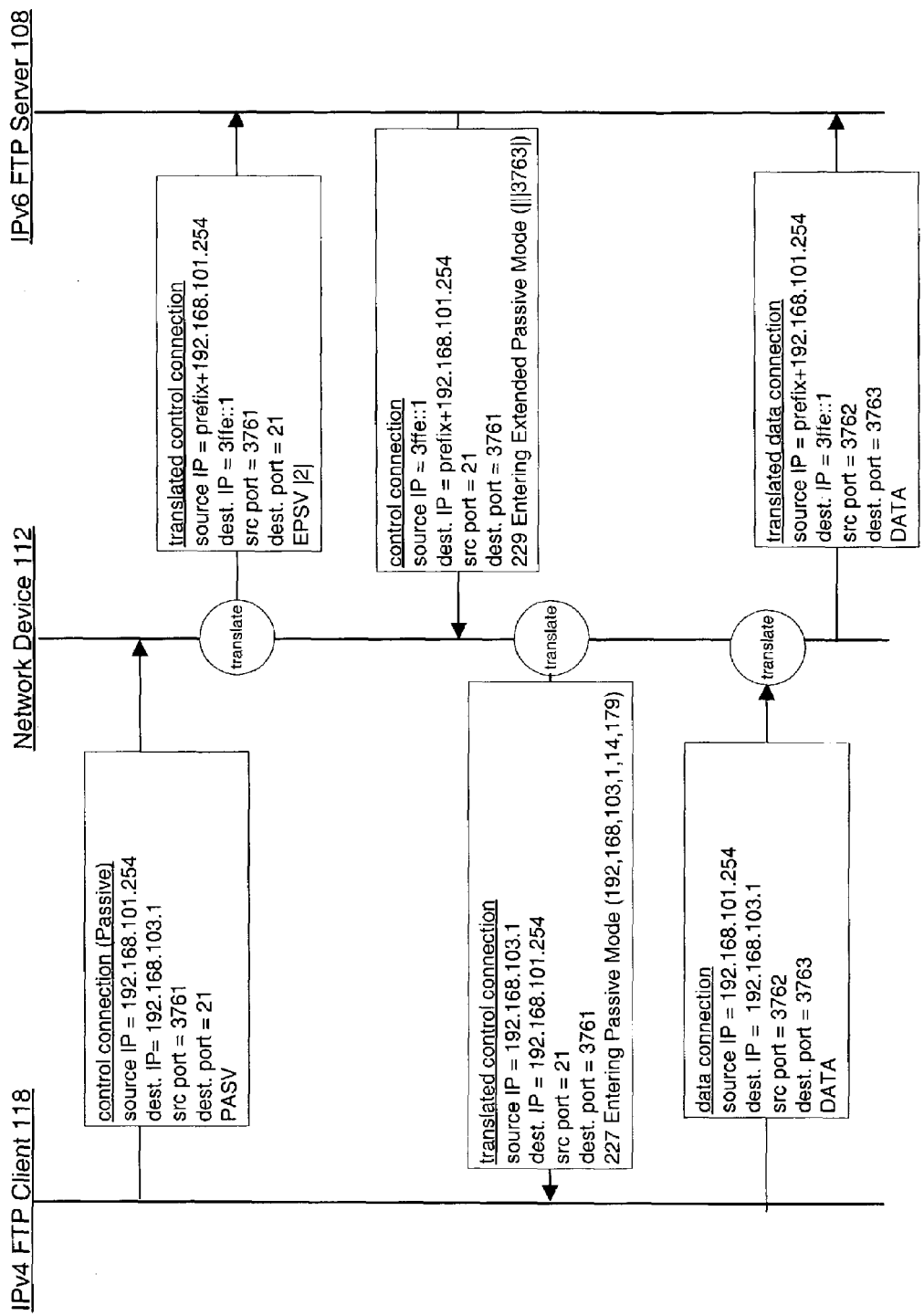
FIG. 2B is a communication diagram illustrating a passive type FTP session initiated by IPv4 FTP client to IPv6 FTP server in accordance with one embodiment of the present invention.

FIG. 2B is a communication diagram illustrating a passive type FTP session initiated by IPv4 FTP client 118 to IPv6 FTP server 108 in accordance with one embodiment of the present invention. Initially, IPv4 FTP client 118 sends a control connection packet having a source IP address equal to 192.168.101.254 and a destination IP address equal to 192.168.103.1. In this case, the source port is equal to 3761 and the destination port is equal to 21. The control command is in the form of "PASV" which is an IPv4 format that indicates a passive type FTP connection. The network device 112 receives this control connection and translates it into a translated IPv6 control connection packet. The translated control connection packet has a source IP address equal to prefix+192.168.101.254 and a destination IP address equal to 3ffe::1, which is translated as described above for the active type FTP session. The source and destination ports remain the same. The IPv4 control command PASV is translated into a translated IPv6 control command having the format "EPSV |2|". The EPSV is an IPv6 command that indicates that the FTP session is a passive connection. The "2" indicates that the address that follows is an IPv6 address.

In the passive mode, the client initiates the data connection. Accordingly, the server needs to specify on which port it will listen for the FTP data connection being initiated by client. As shown, the IPv6 FTP server 108 receives the control connection packet for a passive session from IPv4 client 118 and transmits a control connection packet in response. This control connection packet from the server 108 has a source IP address equal to 3ffe::1 and a destination IP address equal to prefix+192.168.101.254. The source port equals 21, and the destination port equals 3761. The reply has the form "229 Entering Extended Passive Mode (|||3763|)". The "229 Entering Extended Passive Mode" indicates that this IPv6 control packet is in response to the IPv6 EPSV command from the client. The 3763 specifies the port on which the server will listen for establishment of the data connection by the client. Under current requirements for an FTP session, the server may specify any port greater than 1024 and which is not already in use. However, this requirement may change in the future.

The network device 112 receives this control connection packet and translates it into a translated control packet having a source address equal to 192.168.103.1 and a destination IP address equal to 192.168.101.254. The source and destination ports remain the same. However, the reply is translated into a format equal to "227 Entering Passive Mode (192, 168, 103, 1, 14, 179). The "227 Entering Passive Mode" is an IPv4 reply which corresponds to the IPv6 "229 Entering Extended Passive Mode" reply.

After the IPv4 client 118 receives the control connection packet from the server 108, it may then send a data connection packet to establish the FTP data connection between itself and server 108. In this example, the data connection packet has a source IP address equal to 192.168.101.254 and a destination IP address equal to 192.168.103.1. The source port is equal to 3762 and the destination is equal to 3763, which is the port specified by the server in the previous control packet. The data connection packet also includes data. The network device 112 translates the source and destination IP addresses.

Figure 3A:
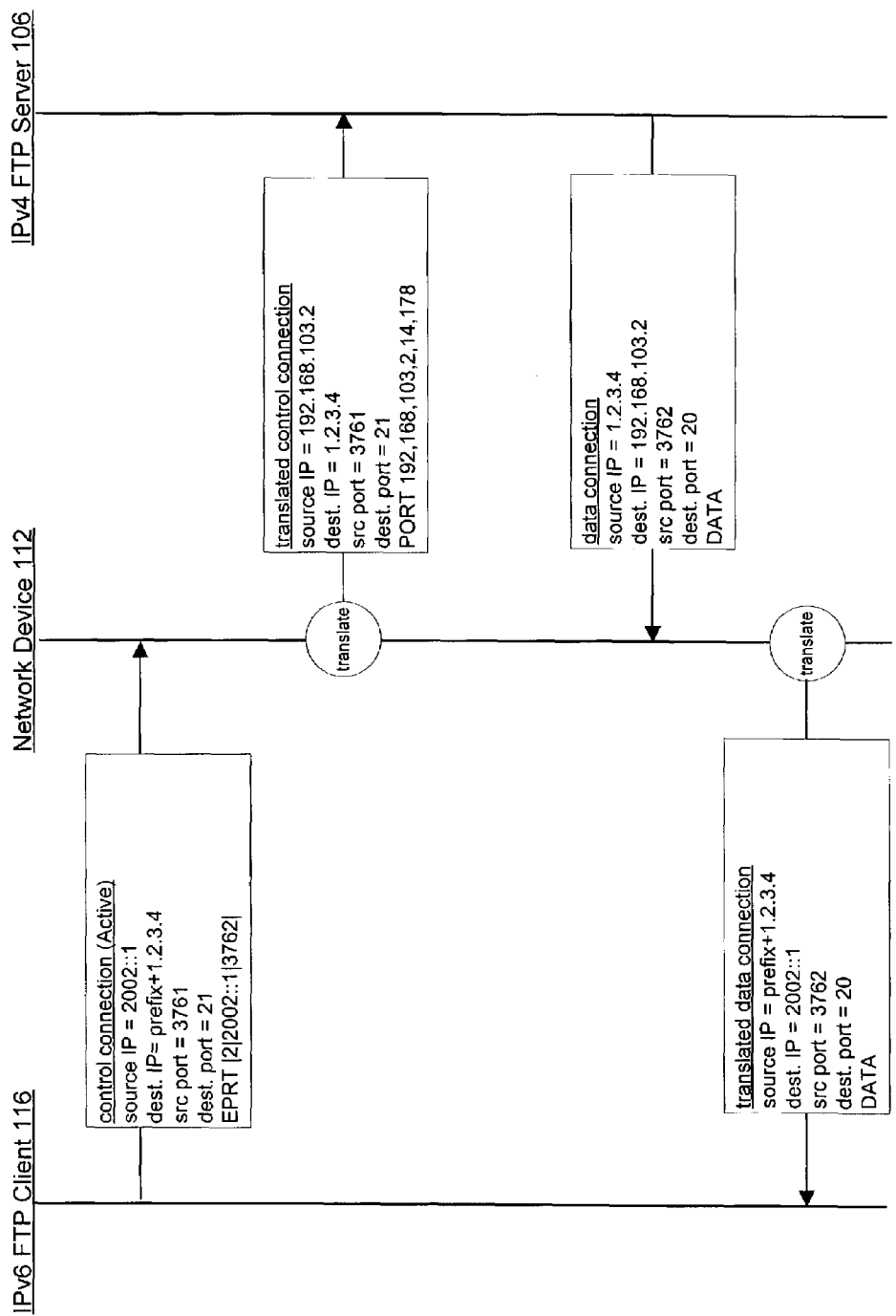
FIG. 3A is a communication diagram illustrating an active type FTP session between a IPv6 client to an IPv4 server in accordance with one embodiment of the present invention.

FIG. 3A is a communication diagram illustrating an active type FTP session between a IPv6 client 116 to an IPv4 server 106 in accordance with one embodiment of the present invention. This communication diagram is similar to the communication diagram of FIG. 2A of an IPv4 client and IPv6 server active session, except the translations are reversed. As shown, the client 116 sends a control connection packet having a source IP address equal to 2002::1 and a destination IP address equal to prefix+1.2.3.4 to network device 112. The control connection packet also has a source port equal to 3761 and a destination port equal to 21. In the active mode, the IPv6 control command takes the form "EPRT |2|2002::1|3762|.

The network device 112 receives the control connection from the IPv6 client 116 and translates it into a translated IPv4 control connection packet. The translated control connection packet has a source IP address equal to 192.168.103.2 and a destination IP address equal to 1.2.3.4. The translated source address is obtained from the MAP table and the translated destination address is obtained by stripping off the prefix. The source and destination ports remain the same, while the control command is translated into an IPv4 format equal to "PORT 192,168,103,2,14,178". This translated control connection packet is sent to IPv4 server 106.

The server 106 then responds with a data connection packet having a source IP address equal to 1.2.3.4 and a destination IP address equal to 192.168.103.2. In this example, the source port is equal to 3762 (as specified by the previous control packet) and the destination port is equal to 20. The data connection packet also includes data. The network device 112 receives this data connection packet and translates it into a translated data connection packet which is forwarded to the IPv6 client 116. The translated data connection packet has a source IP address equal to prefix+1.2.3.4 and a destination IP address equal to 2002::1 (obtained from the MAP table). The source and destination ports remain the same, as well as the data.

Figure 3B:
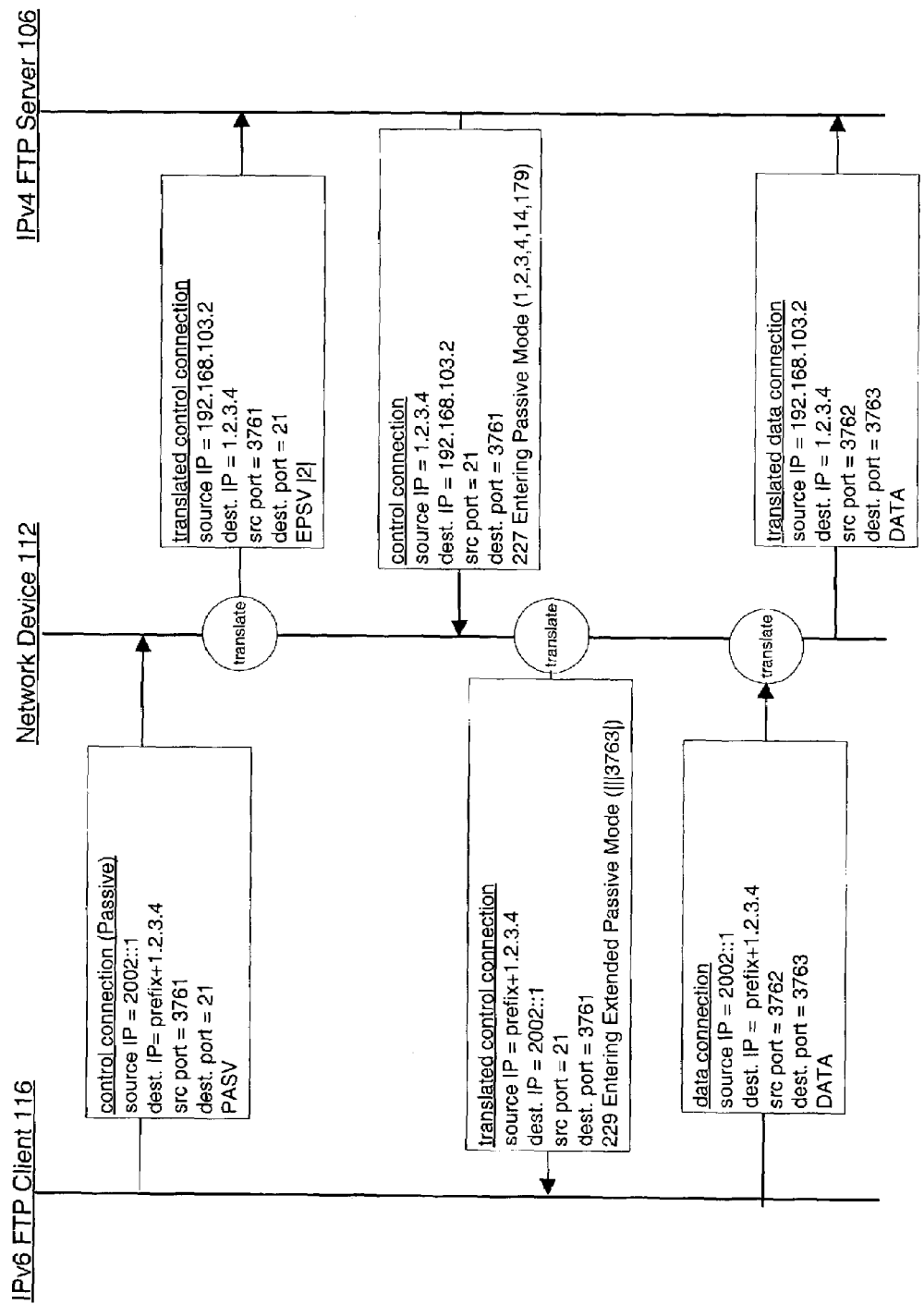
FIG. 3B is a communication diagram illustrating a passive type FTP connection between an IPv6 client and a IPv4 server in accordance with a specific embodiment of the present invention.

FIG. 3B is a communication diagram illustrating a passive type FTP connection between an IPv6 client 116 and a IPv4 server 106 in accordance with a specific embodiment of the present invention. This communication diagram is similar to the communication diagram of FIG. 2B of an IPv4 client and IPv6 server passive session, except the translations are reversed. The client 116 sends a control connection packet having a source IP address equal to 2002::1 and a destination IP address equal to prefix+1.2.3.4. The source port equals 3761, and the destination port equals 21. In the passive case, the IPv6 control command takes the form "PASV".

The network device 112 translates this control connection into a packet having a source address equal to 192.168.103.2 and a destination address equal to 1.2.3.4. The source and destination ports remain the same, while the control command is translated into an IPv4 command having the form "EPSV |2|". The server 106 responds with a control connection packet having a source IP address equal to 1.2.3.4 and a destination address equal to 192.168.103.2. The source port equals 21, and the destination port equals 3761. The reply is in the IPv4 form of "227 Entering Passive Mode (1,2,3,4,14, 179). This control connection packet is translated by the network device 112 into a translated control connection packet having a source IP address equal to prefix+1.2.3.4 and a destination address equal to 2002::1. The source and destination ports remain the same. The reply takes the IPv6 form "229 Entering Extended Passive Mode (|||3763|)"

The IPv6 client 116 may then send a data connection packet to server 106. The data connection packet has a source IP address equal to 2002::1 and a destination IP address equal to prefix+1.2.3.4. The source port equals 3762 and the destination port equals 3763, as specified by the previous control packet sent by the server to the client. The data connection packet includes a payload having data. The network device 112 then translates the data connection packet into a translated data connection packet having a translated source and destination IP address.

Figure 4:
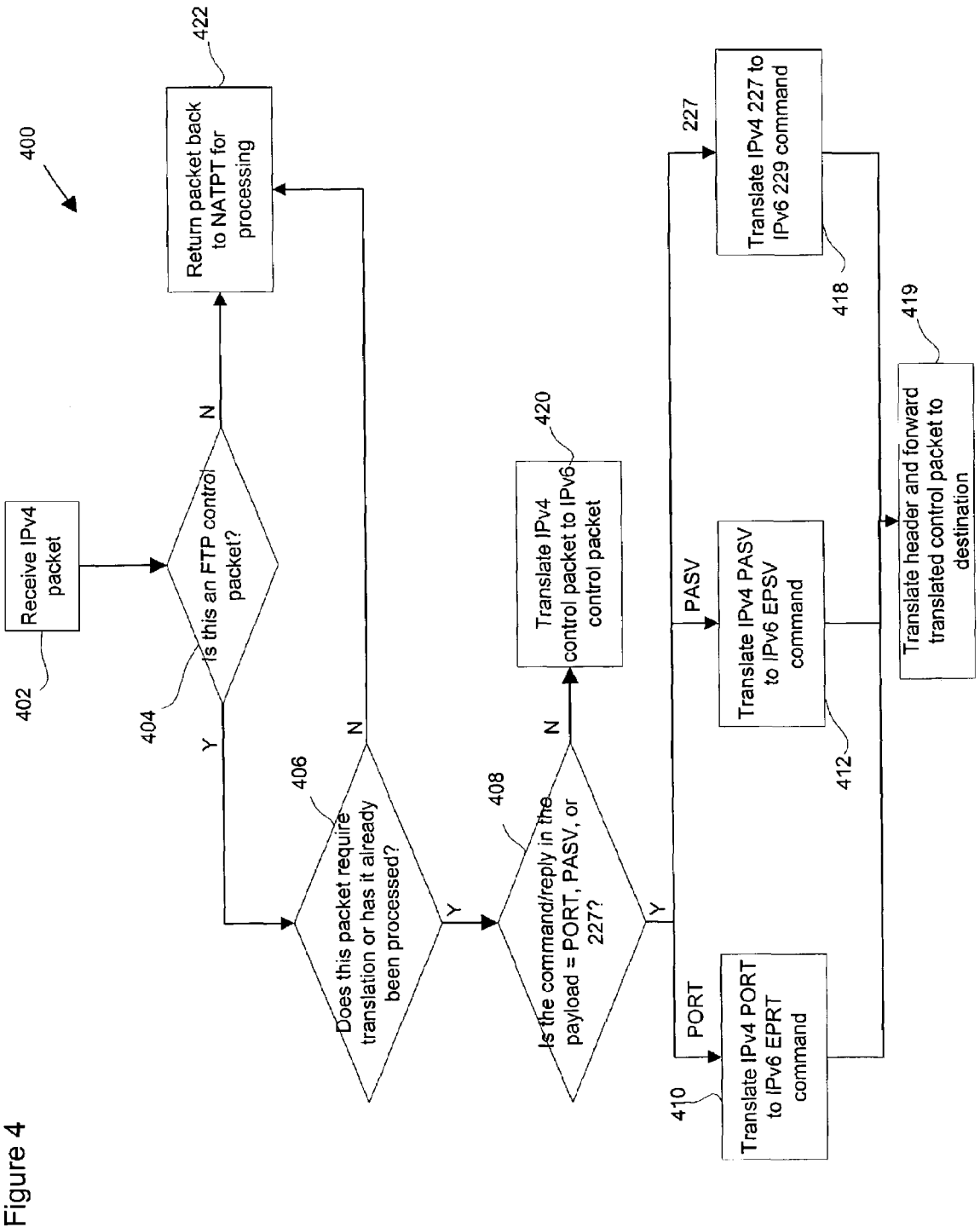
FIG. 4 is a flowchart illustrating a procedure for handling IPv4 FTP control packets in accordance with one embodiment of the present invention.

FIG. 4 is a flowchart illustrating a procedure 400 FTP for handling IPv4 FTP control packets in accordance with one embodiment of the present invention. Initially, an IPv4 packet is received in operation 402. Although separate procedures are shown for implementation on received IPv4 packets and IPv6 packets (described below with respect to FIG. 5), of course, the procedures for handling both types of protocols (IPv4 and IPv6) may be integrated into a single procedure.

After an IPv4 packet is received, it is then determined whether this is an FTP control packet in operation 404. Although the packet may initially go to NAT device 120 within the network device 114, the NAT device 120 is preferably configured to send all FTP control packets to the FTPALG 124. This configuration may be accomplished in any suitable manner. In one implementation, the FTPALG 124 registers itself with the NAT device 120, and the NAT device 120 then adds the FTPALG 124 to its ALG table which contains entry points for devices which handle specific applications. In this case, the ALG table contains an entry point for the FTPALG 124, and this entry point is also associated with a source and destination port value equal to 21, which correspond to an FTP control packet. Thus, when the NAT device 120 receives a packet having a source or destination port having a 21 value, it forwards such packet to the FTPALG 124 via the registered entry point. In contrast, packets which do not contain a source or destination port value of 21 are not forwarded to the FTPALG 124 but handled by the NAT device 120 (if translation is needed).

If it is determined that the received IPv4 packet is an FTP control packet, it is then determined whether this packet requires translation or whether it has already been processed in operation 406. Techniques for determining whether a packet requires translation are described further below. If this packet requires translation, it is then determined whether the payload includes a command (or reply) in the form of one of the following: PORT, PASV, or 227. If there is a command (or reply) in one of these following formats, each command (or reply) is translated accordingly. That is, the IPv4 PORT command is translated into a IPv6 EPRT command in operation 410. The IPv4 PASV command is translated to an IPv6 EPSV command in operation 412. The IPv4 227 reply is translated into an IPv6 229 reply in operation 418.

After the command (or reply) is translated in the payload, the header of the packet is then translated in operation 419. However, the header may alternatively be translated prior to translating the payload contents. The translated control packet is also forwarded to its intended destination in operation 419. For example, the FTPALG 124 may send the IPv6 translated control packet to the IPv6 stack of network device 112. Preferably, the IPv4 control packet which was initially received by the network device 112 is dropped after a translated control packet is created based on such received control packet.

If this is not an FTP control packet, the packet is returned back to the NAT-PT 120 for further processing in operation 422. This also occurs when the packet does not require translation of the payload or has already been processed by the FTP ALG. In this later case, the control packet is returned to the IPv4 stack for further processing. Of course, if the packet does not require translation, it may simply be returned to the IPv4 stack without going first to the NAT-PT 120.

Figure 5:
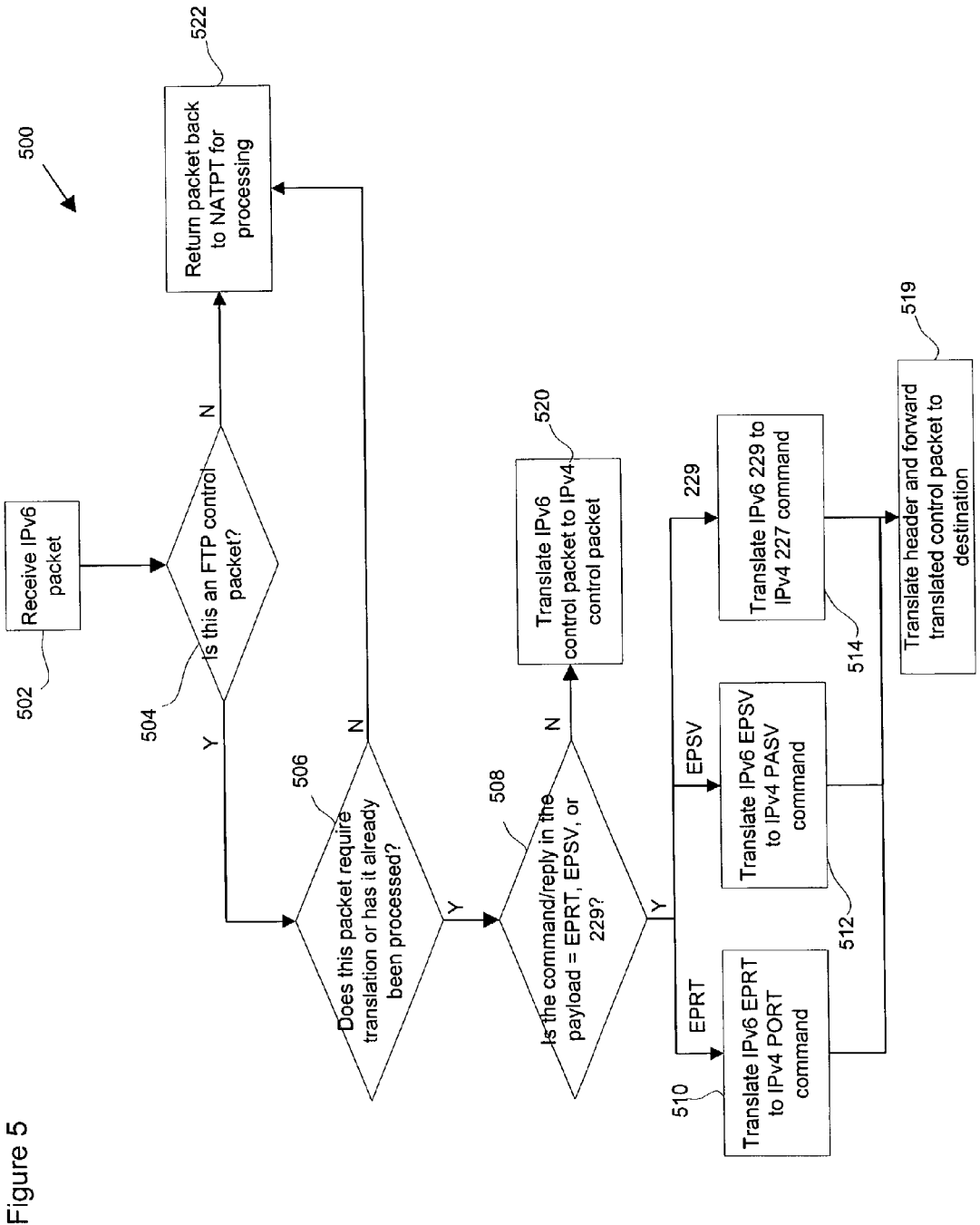
FIG. 5 is a flowchart illustrating a procedure for handling IPv6 FTP control packets in accordance with one embodiment of the present invention.

FIG. 5 is a flowchart illustrating a procedure 500 for handling IPv6 FTP control packets in accordance with one embodiment of the present invention. Initially, an IPv6 packet is received in operation 502. Operations 502 through 506 and 522 are similar to operations 402 through 406 and 422 of FIG. 4.

If the received IPv6 packet is a control packet that requires translation, it is then determined whether the payload includes a command (or reply) in the format of one of the following: EPRT, EPSV, or 229. If there is a command (or reply) in one of these formats, each command (or reply) is translated accordingly. That is, the IPv6 EPRT command is translated into an IPv4 PORT command in operation 510. The IPv6 EPSV command is translated to an IPv4 PASV command in operation 512. The IPv6 229 reply is translated into an IPv4 227 reply in operation 518. Other types of IPv6 commands (or reply), besides those in the above list, may also be translated as illustrated in operation 520.

After the command (or reply) is translated in the payload, the header of the packet is then translated (e.g., by the NAT-PT 120) and the translated control packet is forwarded to its intended destination in operation 519. For example, the FTPALG 124 may send the IPv4 translated control packet to the IPv4 stack of network device 112. Of course, the header translation may alternatively occur prior to the payload translation. Preferably, the IPv6 control packet which was initially received by the network device 112 is dropped after a translated control packet is created based on such received control packet.

If this is not an FTP control packet, the packet is returned back to the NAT-PT 120 for further processing in operation 522. This also occurs when the packet does not require translation of the payload or has already been processed by the FTP ALG. In this later case, the control packet is returned to the IPv4 stack for further processing. Of course, if the packet does not require translation, it may simply be returned to the IPv6 stack without going first to the NAT-PT 120.

Figure 6A:
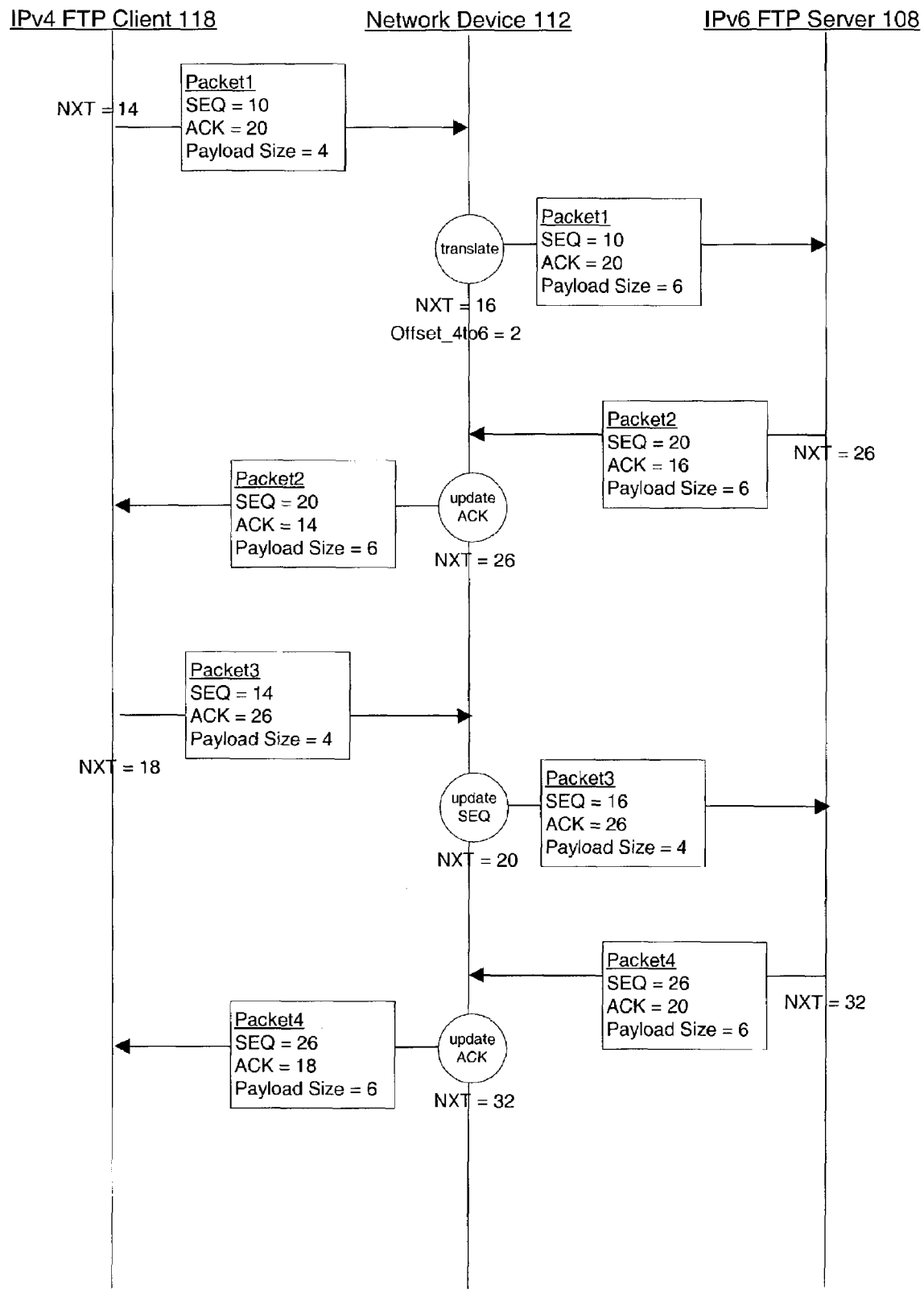
FIGS. 6A through 6B illustrate a procedure for adjusting the sequence (SEQ) or acknowledgment (ACK) numbers of FTP packets in accordance with a further embodiment of the present invention.
Figure 6B:
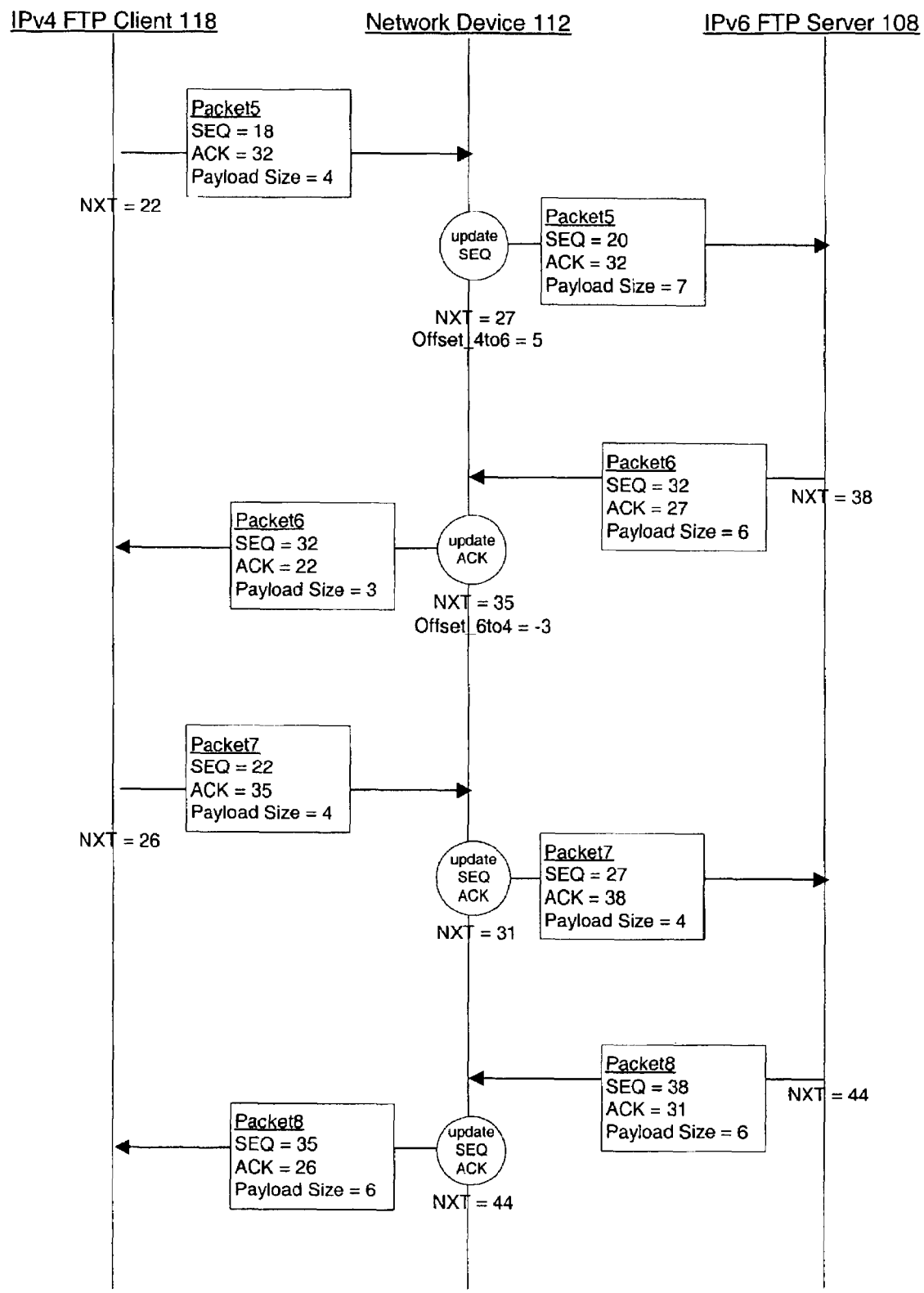

FIGS. 6A through 6B illustrate a procedure 600 in communication diagram form for adjusting the sequence (SEQ) or acknowledgment (ACK) numbers of the FTP packets in accordance with a further embodiment of the present invention. The SEQ and ACK field typically form part of the TCP (transmission control protocol) header. In this example, an FTP client 118 sends a packet1 having a SEQ equal to 10 and an ACK equal to 20. The initial SEQ value may be generated randomly or in any suitable manner. The ACK value corresponds the SEQ value plus the payload size of the last packet received by the client 118 from server 108. The payload size of packet1 is equal to 4. The client 118 has a NXT value equal to 14, which represents an expected value for the ACK number of a return packet sent by the server 108 in response to packet1. The NXT value is generally determined by adding the payload size to the SEQ value (10+4=14).

Network device 112 receives packet1 and translates packet1 from an IPv4 into an IPv6 packet having a SEQ equal to 10 and an ACK equal to 20. The payload size is now equal to 6. The NXT value for this translated packet equals 16 (10+6). The network device 112 also stores a value for the difference in payload size between the IPv4 and IPv6 packet within an offset_4 to 6 variable. This offset_4 to 6 variable may later be used to adjust the SEQ or ACK values for subsequent packets between client 118 and 108.

The server 108 then sends a packet2 having SEQ equal to 20, ACK equal to 16, and a payload of 6. The SEQ value corresponds to the last packet's SEQ value plus the payload size. The ACK value corresponds to the SEQ value plus the payload size of packet1. The NXT equals 26 for the expected ACK in response to packet2 (20+6). The network device 112 then receives packet2 and updates the ACK based on the offset_4 to 6 value of 2. Note that the received packet2's ACK value 27 (prior to updating) corresponds to the packet1's NXT value at the network device 122. Accordingly, packet2 now has a ACK value of 14 (16−2). The payload size remains the same in this case.

When the client 118 receives packet2, the client checks whether the ACK value corresponds to the NXT value 14. In this case, packet2's ACK value 14 matches the NXT value 14. However, if these two numbers failed to match, the client 118 may send an error message to server 108 or resend packet1. Similarly, the client checks whether packet2's SEQ value matches the last received ACK value by the client. In this case, packet2's SEQ value 20 matches packet1's ACK value 20. After packet2 is determined to be valid, the client 118 then sends packet3 having SEQ equal to 14 and ACK equal to 26. The payload size equals 4. The NXT value equals 18. The network device 112 then receives packet3 and updates the SEQ based on the offset_4 to 6 value so that it now equals 16 (14+2). The NXT for the network device now equals 20.

After the server 108 receives packet3, the server 108 checks whether packet3's ACK value 26 matches it's previous NXT value 26, which it does. The server also checks whether packet3's SEQ value 16 matches packet2's ACK value 16, which it does. The server 108 then transmits packet4 having SEQ equal 26, ACK equal 20 and payload size equal to 6. The NXT value for packet4 equals 32. The network device 112 then updates the ACK value to 18 by subtracting the offset_4 to 6 value of 2.

After the client 118 receives packet4, it checks whether packet4's ACK value 18 matches its current NXT value 18, which it does. The client also checks whether packet4's SEQ value 26 matches packet3's ACK value 26, which it does. Referring to FIG. 6B, the client 118 then sends packet5 having SEQ equal to 18, ACK equal to 32, and a payload size equal to 4. The network device 112 updates the SEQ value by adding the offset_4 to 6 value 2. Thus, the translated packet 5 has SEQ equal to 20, ACK equal to 32, and, in this case the payload size has increased to 7. Since the payload size has increased for a packet sent from the IPv4 client 118 to the IPv6 server 108, the offset_4 to 6 value is updated to a value of 5. The NXT for packet5 is equal to 27.

When the server 108 receives packet5, it checks whether packet5's ACK value 32 matches its current NXT value 32, which it does. The server 108 also checks whether packet5's SEQ value 20 matches packet4's ACK value 20, which it does. The server 108 then sends packet6 having a SEQ equal to 32, an ACK equal to 27, and a payload size equal to 6. The NXT value for packet6 equals 38 (32+6). When the network device 112 receives packet6, it updates the ACK value of packet6 based on offset_4 to 6 value 5. Accordingly, packet6 now has a SEQ equal to 32, ACK equal to 22 (27−5). In this example, packet6 has a new payload size equal to 3. Translated packet6 is forwarded to client 118. Network device is 112 now has a NXT value equal to 35 and also stores a value of −3 based on the difference in payload size of the IPv6 packet and the IPv4 packet6 in an offset_6 to 4 variable.

Upon receipt of packet6, client 118 checks whether packet6's ACK value 22 matches its current NXT value 22, which it does. The client also checks whether packet6's SEQ value 32 matches packet5's ACK value 32, which it does. The IPv4 client 118 then sends packet7 having a SEQ equal to 22, an ACK equal to 35, and a payload size equal to 4. The network device 112 updates both the SEQ and ACK based on the offset values. The offset_6 to 4 value of −3 is subtracted from the ACK value 35 to result in an ACK value of 38. The offset_4 to 6 value of 5 is added to the SEQ value (22) to result in a value of 27.

After receipt of packet7, the server 108 checks whether the ACK value 38 of packet7 matches the current NXT value 38. The server 108 also checks whether the SEQ value of packet7 (27) matches the ACK value of packet6 (27). Packet7 passes both of these checks. The server in this case then sends packet8 having a SEQ equal to 38, an ACK equal to 31, and a payload size equal to 6. The NXT equals 44 in this case. The network device 112 then updates both the SEQ and ACK value. Accordingly, packet8 now has a SEQ value of 35 (38+−3) and an ACK value of 26 (31−5). Note that the ACK value of packet8 (26) matches the current NXT value (26) and the SEQ value of packet8 (35) matches the ACK value of packet7 (35) sent by client 118.

Figure 7:
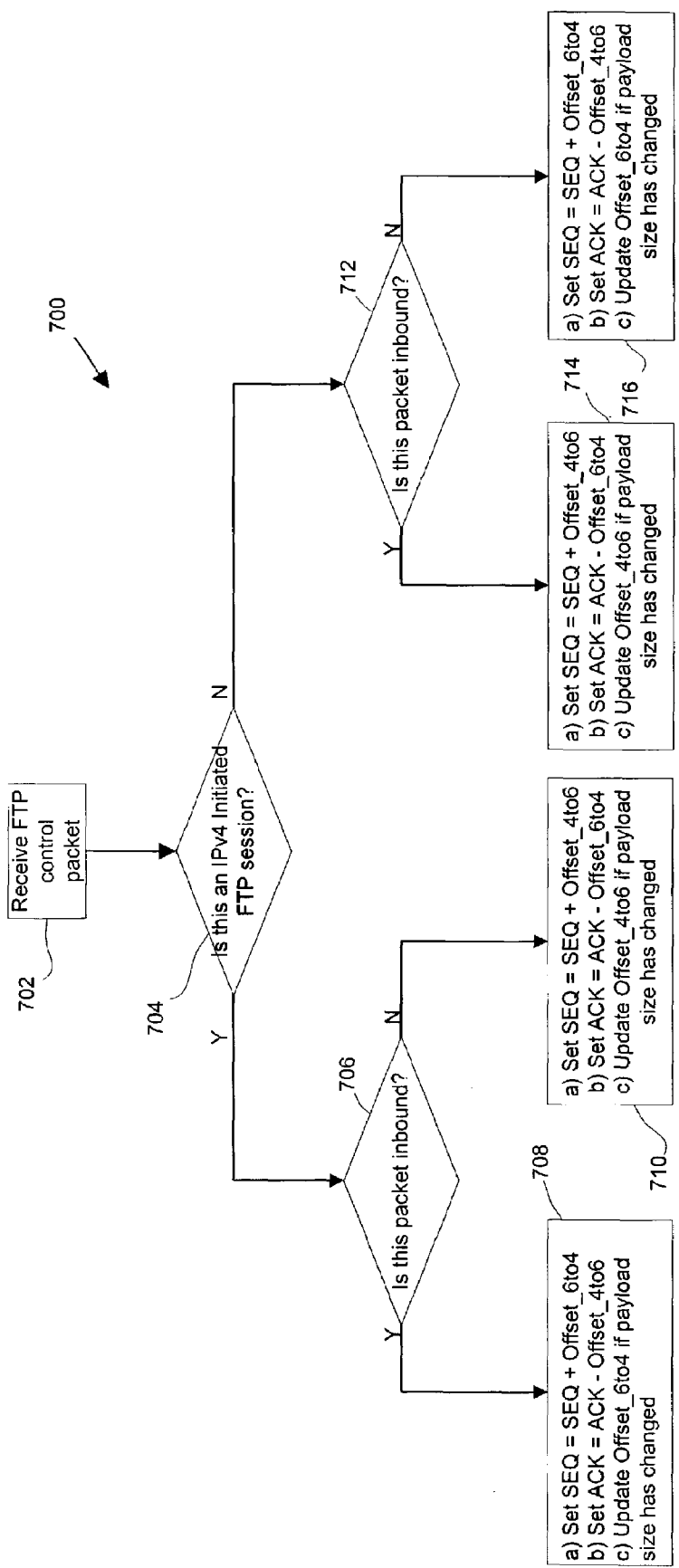
FIG. 7 is a flowchart illustrating a procedure 700 for updating SEQ and ACK numbers of packets translated between an IPv4 and IPv6 client and server, and visa versa, in accordance with one embodiment of the present invention.

FIG. 7 is a flowchart illustrating a procedure 700 for updating SEQ and ACK numbers of packets translated between an IPv4 and IPv6 client and server, and visa versa, in accordance with one embodiment of the present invention. Initially, an FTP control packet is received in operation 702. It is then determined whether this is an IPv4 initiated FTP session (to which the received packet belongs) from an IPv4 client to an IPv6 server in operation 704. If this is an IPv4 initiated FTP session, it is then determined whether this packet is inbound (going from IPv6 server to IPv4 client) in operation 706.

If this packet is inbound, the SEQ is updated and set to the SEQ value plus the offset_6 to 4 value in operation 708. The ACK value is set equal to the ACK value minus the offset_4 to 6 value. Note that the offset values are initially set to zero. The offset_6 to 4 value is also updated if the payload size has changed in operation 708. Alternatively, the offset_6 to 4 value may be updated and set equal to offset_6 to 4 plus (old payload length minus new translated payload length) after each FTP control packet is translated and forwarded to its destination. The offset_6 to 4 value will only change when the payload size changes. If this packet is not inbound, or rather it is outbound (being sent from the IPv4 client to the IPv6 server), the offset_4 to 6 value is added to the SEQ value, the offset_6 to 4 value is subtracted from the ACK value, and the offset_4 to 6 value is updated if the payload size has changed in operation 710. Alternatively, the offset_4 to 6 value may be updated and set equal to offset_4 to 6 plus (old payload length minus new translated payload length) after each FTP control packet is translated and forwarded to its destination.

If this is an IPv6 initiated FTP session (to which the received packet belongs) from an IPv6 client to an IPv4 server, it is then determined whether this packet is inbound (going from IPv4 server to IPv6 client) in operation 712. If this packet is inbound, the SEQ is updated and set to the SEQ value plus the offset_4 to 6 value in operation 714. The ACK value is set equal to the ACK value minus the offset_6 to 4 value in operation 714. The offset_4 to 6 value is also updated if the payload size has changed (or after each translation of an FTP control packet) in operation 708. If this packet is not inbound, or rather it is outbound (being sent from the IPv6 client to the IPv4 server), the offset_6 to 4 value is added to the SEQ value, the offset_4 to 6 value is subtracted from the ACK value, and the offset_4 to 6 value is updated if the payload size has changed (or after each translation of an FTP control packet) in operation 716.

The FTP handling techniques of the present invention facilitate FTP communications between the following different devices, among others: between a LAN IPv4 client and a LAN IPv6 server, between a LAN IPv4 client and a WAN IPv6 server, between a LAN IPv6 client and a LAN IPv4 server, and between a LAN IPv4 client and WAN IPv6 server. Sessions are also facilitated between dual-stack devices which utilize both protocols. In other words, the techniques of the present invention facilitate the FTP transfer from any client to any server, across IPv4-IPv6 boundaries that appear transparent to the client and the server. Used together with NATPT and DNSALG as described in the above reference U.S. patent application filed 11 Apr. 2003, the FTP handling techniques described herein ensure that there are no session breaks between IPv4 and IPv6 devices.

Translation of the IP headers and payload addresses may be performed using any conventional address and protocol translation techniques. In one embodiment, a pool table of available translation addresses and a prefix for translating between protocols may be pre-configured within the network device 112. FIG. 8A is a diagrammatic representation of an addresses pool table 800 in accordance with one embodiment of the present invention. The pool table includes a pool of addresses available to the NAT-PT 120, DNSALG 122, and FTPALG which may be used for translating an IP address or FTP payload address. As shown, the pool table 800 includes a plurality of entries 802a through 802c. Each entry 802 includes a pool address 806 and a use field 804 that indicates whether the corresponding address is in use. In the illustrated example, entry 802a includes pool address 192.168.103.1 and entry 802b has pool address 192.168.103.2 and their use fields are set to one. In this example, a one in these use fields indicates that the addresses 192.168.103.1 and 192.168.103.2 are in use. In contrast, the entry 802c has a pool address 192.168.103.255 and a use flag set to zero which indicates that such address is not in use.

In the example of FIG. 3A, when the IPv6 FTP client 116 initiates an FTP session to IPv4 FTP server 106, the control connection packet sent by client 116 containing a source IP address of 2002::1 is received by FTPALG 124. An available IPv4 address from the pool table is substituted for the received IPv6 address. In this case, the DNSALG 122 (or NAT-PT 120) translates the IPv6 address 2002::1 into IPv4 address 192.168.103.2. The binding between the IPv6 and matching IPv4 pool addresses is then tracked and later used for translation of the data connection packets sent between the IPv6 FTP client 116 and the IPv4 FTP server 106. In general, it may be determined whether a packet requires translation by determining whether the destination address is present within the MAP table or contains a pre-configured prefix.

Any suitable mechanism may be used to track bindings between IPv4 and IPv6 addresses. FIG. 8B is a diagrammatic representation of a MAP table 850 in accordance with one embodiment of the present invention. As shown, the MAP table includes two entries 852a and 852b although it may include any number of entries. Each entry includes an IPv4 pool address 854, a corresponding IPv6 address 856, and a timer 858. The timer may be used to expunge a binding after a period of idleness. The timer is re-initiated after each use of the binding. In the examples of FIGS. 2A and 2B, a binding is used wherein the IPv4 address is 192.168.103.1; the IPv6 address is 3ffe::1; and the timer is set to T1. In the examples of FIGS. 3A and 3B, a binding is used wherein the IPv4 address is 192.168.103.2; the IPv6 address is 2002::1; and the timer is set to T2.

A pre-configured prefix may be used to translate between IPv4 and IPv6 addresses, as is well known to those skilled in the art. For the examples of FIGS. 2A and 2B, when FTP client 118 sends a control packet to FTP server 108, a prefix is pre-pending to the address 192.168.101.254 of client 118 within the header and payload of the control packet to form an IPv6 address prefix+192.168.101.254. Likewise, the prefix is removed from the destination address value when a data connection packet is sent by server 108 to client 118.

The above described FTP control packet handling techniques are applied individually to each FTP session. For example, tracking and updating of the SEQ and ACK numbers are performed with respect to each FTP session. That is, an offset_4 to 6 and offset_6 to 4 value is updated for each session. Each FTP session may also time out when idle for a predetermined period of time. Each FTP session may be tracked by any suitable manner. In one embodiment, an FTP data structure is used to track an offset entry for each FTP session. For example, the FTP data structure may include a pointer to a list of entries for the FTP sessions, a pointer to the end of such list, a pointer to the start of the active FTP entries, a pointer to the end of the active FTP entries, a pointer to the start of the free (available or not in use) FTP entries, and a pointer to the end of the free FTP entries.

FIG. 8C is a diagrammatic representation of an example offset entry 870 for a particular FTP session in accordance with one embodiment of the present invention. The entry contains a number of fields for holding parameters related to a particular IPv4-IPv6 FTP session. As shown, the offset entry 870 includes a Next pointer 872 which points to the next entry or a NULL if there is no next entry, a Source Address field 874, a Destination Address field 876, a Source Port field 878, a Destination Port field 880, an offset_4 to 6 field 882, and an offset_6 to 4 field 884. The Source Address, Destination Address, Source Port, and Destination Port fields (or tuple) may be used to identify packets as belonging to a particular session and may be obtained from any suitable one of the initial FTP control packets. The tuple of subsequent packets may then be matched against the offset entry tuples within the FTP data structure to obtain the appropriate offset_4 to 6 or offset_6 to 4 values of that particular session. Alternatively, any suitable identifier, besides a packet tuple, may be used to identify a particular FTP session.

Generally, the techniques for handling FTP control packets (as well as for translating addresses and protocols) of the present invention may be implemented on software and/or hardware. For example, it can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT-PT, DNSALG 122, and FTPALG 124) may be implemented on a general-purpose network host machine such as a personal computer or workstation. Further, the invention may be at least partially implemented on a card (e.g., an interface card) for a network device or a general-purpose computing device.

Figure 9:
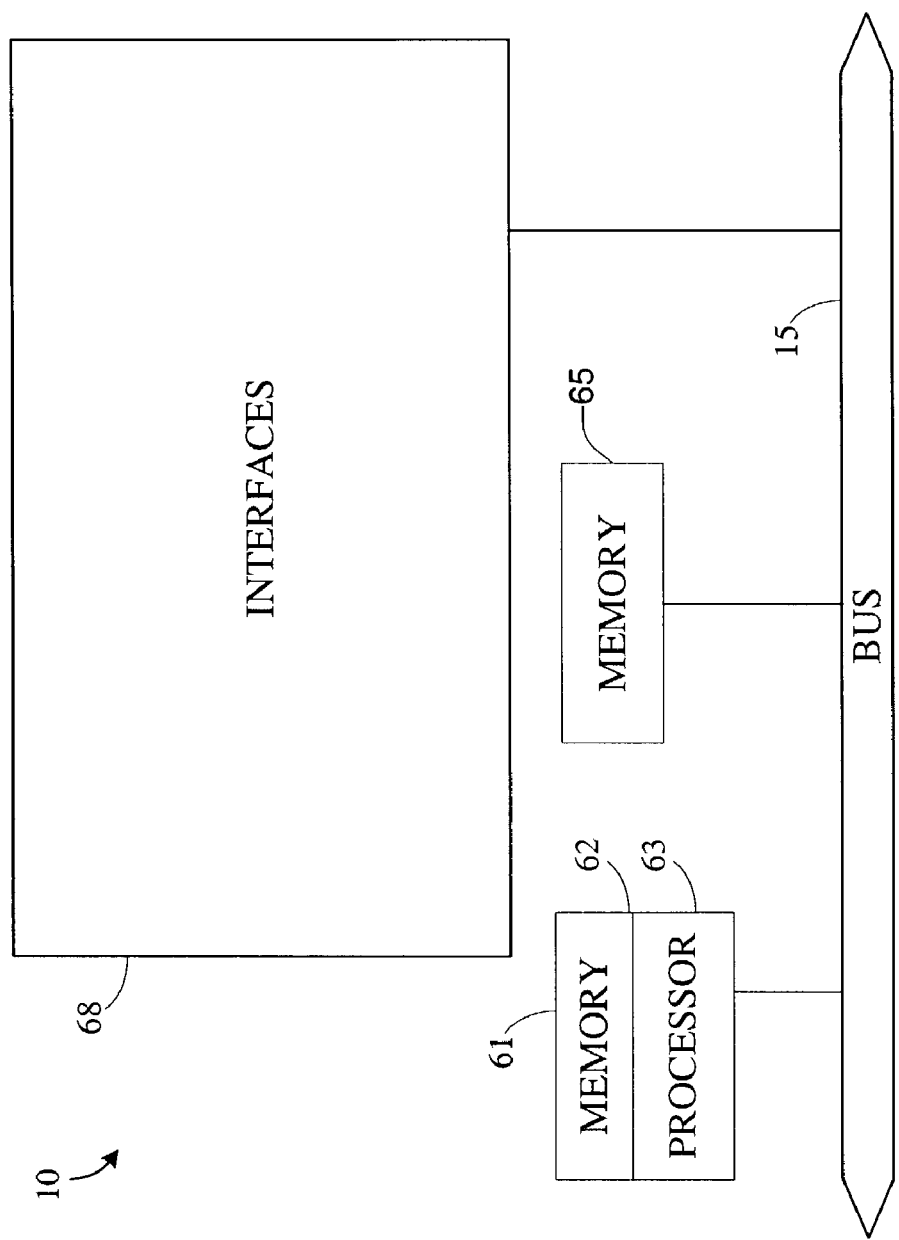
FIG. 9 is a diagrammatic representation of a router in which embodiments of the present invention may be implemented.

Referring now to FIG. 9, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing protocol conversions between a first and second protocol (e.g., IPv4 and IPv6), translating FTP control commands (or replies), updating SEQ and/or ACK numbers, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 9 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, a MAP table, a pool table, FTP data structure, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for handling file transfer protocol (FTP) packets, comprising:
   receiving an FTP packet that is being sent between an FTP client and an FTP server in a current FTP session, wherein the FTP client and FTP server use a different IPv4 or IPv6 protocol;
   determining whether the FTP packet is being sent using an IPv4 protocol or an IPv6 protocol;
   translating any addresses and FTP commands or replies from an IPv4 format to an IPv6 format or visa versa, based on the determination as to whether the FTP packet is being sent using an IPv4 protocol or an IPv6 protocol;

updating a next (NXT) value with the FTP packet's SEQ value plus a size of the payload after translation, wherein the NXT value represents an expected ACK value of a return FTP packet sent in response to the FTP packet;

prior to updating the NXT value, determining that the FTP packet is valid if the FTP packet's ACK value equals the NXT value;

updating a first offset value for translating from IPv4 to IPv6 or a second offset value for translating from IPv6 to IPv4 to correspond to a change in payload size of the FTP packet due to the translation if any;

prior to updating the first or second offset value, updating a SEQ value or an ACK value of the FTP packet based on the first or second offset value; and forwarding the translated FTP packet to its destination if the FTP packet is determined to be valid.

2. A method as recited in claim 1, wherein the translation includes translating an active type FTP command or reply or translating a passive FTP command or reply.

3. A method as recited in claim 1, wherein the translation includes translating an FTP command that is an IPv4 PORT command into an IPv6 EPRT command or visa versa.

4. A method as recited in claim 3, wherein the translation includes translating an FTP command that is an IPv4 PASV command into an IPv6 EPSV command or visa versa.

5. A method as recited in claim 4, wherein the translation includes translating an IPv4 227 reply into an IPv6 229 reply or visa versa.

6. A method as recited in claim 5, wherein the translation includes translating an FTP command that is an IPv6 EPRT command into an IPv4 PORT command or visa versa.

7. A method as recited in claim 6, wherein the translation includes translating an FTP command that is an IPv6 EPSV command into an IPv4 PASV command or visa versa.

8. A method as recited in claim 7, wherein the translation includes translating an IPv6 229 reply into an IPv4 227 reply or visa versa.

9. A method as recited in claim 1, further comprising:

for each received FTP packet of the current FTP session, repeating the operations for determining, translating, updating the NXT value, determining whether the FTP packet is valid, updating the first or second offset value, updating the SEQ or ACK value of the FTP packet, and forwarding.

10. A method as recited in claim 9, wherein the first and second offset values are equal to zero at the start of the current FTP session and the first and the second offset value both remain constant if the size of the payload does not change for the each FTP packet.

11. A computer system operable to handle FTP packets, the computer system comprising:

one or more processors;

one or more memory, wherein at least one of the processors and memory are adapted for:

receiving an FTP packet that is being sent between an FTP client and an FTP server in a current FTP session, wherein the FTP client and FTP server use a different IPv4 or IPv6 protocol;

determining whether the FTP packet is being sent using an IPv4 protocol or an IPv6 protocol;

translating any addresses and FTP commands or replies from an IPv4 format to an IPv6 format or visa versa, based on the determination as to whether the FTP packet is being sent using an IPv4 protocol or an IPv6 protocol;

updating a next (NXT) value with the FTP packet's SEQ value plus a size of the payload after translation, wherein the NXT value represents an expected ACK value of a return FTP packet sent in response to the FTP packet;

prior to updating the NXT value, determining whether the FTP packet is valid if the FTP packet's ACK value equals the NXT value;

updating a first offset value for translating from IPv4 to IPv6 or a second offset value for translating from IPv6 to IPv4 to correspond to a change in payload size of the FTP packet due to the translation if any;

prior to updating the first or second offset value, updating a SEQ value or an ACK value of the FTP packet based on the first or second offset value; and forwarding the translated FTP packet to its destination if the FTP packet is determined to be valid.

12. A computer system as recited in claim 11, wherein the translation includes translating an active type FTP command or reply or translating a passive FTP command or reply.

13. A computer system as recited in claim 11, wherein the translation includes translating an FTP command that is an IPv4 PORT command into an IPv6 EPRT command or visa versa.

14. A computer system as recited in claim 13, wherein the translation includes translating an FTP command that is an IPv4 PASV command into an IPv6 EPSV command or visa versa.

15. A computer system as recited in claim 14, wherein the translation includes translating an IPv4 227 reply into an IPv6 229 reply or visa versa.

16. A computer system as recited in claim 15, wherein the translation includes translating an FTP command that is an IPv6 EPRT command into an IPv4 PORT command or visa versa.

17. A computer system as recited in claim 16, wherein the translation includes translating an FTP command that is an IPv6 EPSV command into an IPv4 PASV command or visa versa.

18. A computer system as recited in claim 17, wherein the translation includes translating an IPv6 229 reply into an IPv4 227 reply or visa versa.

19. A computer system as recited in claim 11, wherein at least one of the processors and memory are further adapted for each FTP session:

for each received FTP packet of the current FTP session, repeating the operations for determining, translating, updating the NXT value, determining whether the FTP packet is valid, updating the first or second offset value, updating the SEQ or ACK value of the FTP packet, and forwarding.

20. A computer system as recited in claim 19, wherein the first and second offset values are equal to zero at the start of the current FTP session and the first and the second offset value both remain constant if the size of the payload does not change for the each FTP packet.

21. A computer program product for handling FTP packets, the computer program product comprising:

at least one computer readable medium;

computer program instructions stored within the at least one computer readable medium, the instructions when executed causes a computer to perform the following steps:

receiving an FTP packet that is being sent between an FTP client and an FTP server in a current FTP session, wherein the FTP client and FTP server use a different IPv4 or IPv6 protocol;

determining whether the FTP packet is being sent using an IPv4 protocol or an IPv6 protocol;

translating any addresses and FTP commands or replies from an IPv4 format to an IPv6 format or visa versa, based on the determination as to whether the FTP packet is being sent using an IPv4 protocol or an IPv6 protocol;

updating a next (NXT) value with the FTP packet's SEQ value plus a size of the payload after translation, wherein the NXT value represents an expected ACK value of a return FTP packet sent in response to the FTP packet;

prior to updating the NXT value, determining whether the FTP packet is valid if the FTP packet's ACK value equals the NXT value;

updating a first offset value for translating from IPv4 to IPv6 or a second offset value for translating from IPv6 to IPv4 to correspond to a change in payload size of the FTP packet due to the translation if any;

prior to updating the first or second offset value, updating a SEQ value or an ACK value of the FTP packet based on the first or second offset value; and forwarding the translated FTP packet to its destination if the FTP packet is determined to be valid.

22. A computer program product as recited in claim 21, wherein the translation includes translating an active type FTP command or reply or translating a passive FTP command or reply.

23. A computer program product as recited in claim 21, wherein the translation includes translating an FTP command that is an IPv4 PORT command into an IPv6 EPRT command or visa versa.

24. A computer program product as recited in claim 23, wherein the translation includes translating an FTP command that is an IPv4 PASV command into an IPv6 EPSV command or visa versa.

25. A computer program product as recited in claim 24, wherein the translation includes translating an IPv4 227 reply into an IPv6 229 reply or visa versa.

26. A computer program product as recited in claim 25, wherein the translation operations are capable of translating an FTP command that is an IPv6 EPRT command into an IPv4 PORT command.

27. A computer program product as recited in claim 26, wherein the translation includes translating an FTP command that is an IPv6 EPSV command into an IPv4 PASV command or visa versa.

28. A computer program product as recited in claim 27, wherein the translation includes translating an IPv6 229 reply into an IPv4 227 reply or visa versa.

29. A computer program product as recited in claim 21, the method further comprising for each FTP session:

for each received FTP packet of the current FTP session, repeating the operations for determining, translating, updating the NXT value, determining whether the FTP packet is valid, updating the first or second offset value, updating the SEQ or ACK value of the FTP packet, and forwarding.

30. A computer program product as recited in claim 29, wherein the first and second offset values are equal to zero at the start of the current FTP session and the first and the second offset value both remain constant if the size of the payload does not change for the each FTP packet.

31. An apparatus for handling FTP packets, comprising:

means for receiving an FTP packet that is being sent between an FTP client and an FTP server in a current FTP session, wherein the FTP client and FTP server use a different IPv4 or IPv6 protocol;

means for determining whether the FTP packet is being sent using an IPv4 protocol or an IPv6 protocol;

means for translating any addresses and FTP commands or replies from an IPv4 format to an IPv6 format or visa versa, based on the determination as to whether the FTP packet is being sent using an IPv4 protocol or an IPv6 protocol;

means for updating a next (NXT) value with the FTP packet's SEQ value plus a size of the payload after translation, wherein the NXT value represents an expected ACK value of a return FTP packet sent in response to the FTP packet;

means for determining whether the FTP packet is valid if the FTP packet's ACK value equals the NXT value prior to updating the NXT value;

means for updating a first offset value for translating from IPv4 to IPv6 or a second offset value for translating from IPv6 to IPv4 to correspond to a change in payload size of the FTP packet due to the translation if any;

means for updating a SEQ value or an ACK value of the FTP packet based on the first or second offset value prior to updating the first or second offset value; and means for forwarding the translated FTP packet to its destination if the FTP packet is determined to be valid.

* * * * *